United States Patent
Kessler

(10) Patent No.: US 8,312,228 B2
(45) Date of Patent: Nov. 13, 2012

(54) PROCESSING DATA IN SHARED MEMORY BY MULTIPLE PROCESSES

(75) Inventor: Joerg Kessler, Nussloch (DE)

(73) Assignee: SAP AG, Walldorf (DE)

( * ) Notice: Subject to any disclaimer, the term of this patent is extended or adjusted under 35 U.S.C. 154(b) by 322 days.

(21) Appl. No.: 12/754,627

(22) Filed: Apr. 6, 2010

(65) Prior Publication Data

US 2011/0246726 A1 Oct. 6, 2011

(51) Int. Cl.
*G06F 15/167* (2006.01)
(52) U.S. Cl. ................... 711/147; 711/E12.013
(58) Field of Classification Search ............ 711/137, 711/E12.013, 147
See application file for complete search history.

(56) References Cited

U.S. PATENT DOCUMENTS

| | | | |
|---|---|---|---|
| 2004/0054644 A1* | 3/2004 | Ganesh et al. | 707/1 |
| 2004/0221116 A1* | 11/2004 | Hu et al. | 711/158 |
| 2005/0240585 A1* | 10/2005 | Makhervaks et al. | 707/8 |
| 2007/0226422 A1* | 9/2007 | Mino et al. | 711/137 |
| 2008/0294705 A1 | 11/2008 | Brauckhoff et al. | |

* cited by examiner

*Primary Examiner* — Hal Schnee

(57) ABSTRACT

Various embodiments of systems and methods for processing data in shared memory are described herein. A number of work processes of an application server write data in corresponding areas of shared memory. At least one data unit for a first process is read from a first area of the shared memory by the first process. The first process also reads at least one unit of data for a second process from a second area of the shared memory. The first process writes information in a third area of the memory to indicate that the at least one unit of data for the first process and the at least one unit of data for the second process are read. The read data units are aggregated and saved in a storage by the first process.

20 Claims, 10 Drawing Sheets

PROCESSING DATA IN SHARED MEMORY BY MULTIPLE PROCESSES

TECHNICAL FIELD

The field of the invention relates generally to data processing and digital processing systems. More specifically, the invention is related to buffering and processing data in shared memory within a computer systems environment.

BACKGROUND

In general, computer applications provide services to a variety of consumers. Often, the separate services provided by a computer application, or even some of the tasks within a single service, are executed by separate work processes. This is especially true for complex computer applications with many consumers like Enterprise Resource Planning (ERP) systems, customer relationships management (CRM) systems, etc. The separate work processes usually run separate instances of a computer application within the same computer environment, e.g., as in an application server. These separate processes run autonomously, e.g., they are isolated from each other in terms of some operations. However, the processes may share some of the resources of the computer system hosting the application server. For example, such resources include processors, volatile memory, database storage, etc.

The running processes of an application server generate various data related to their work. Such data may include consumers' identification, information about consumer requests, services' data, lists of executed operations and tasks, system parameters, etc. This data is necessary for monitoring and evaluating the performance of work processes, and for maintaining statistics required by audits, for instance. Therefore, the work processes of an application server preserve this data in permanent storages. Usually, the data is saved in database tables or file logs. The operation of saving the data could be a very resource consuming task, occupying a lot of processor time and storage space. The performance of a work process could be significantly decreased by these data saving operations, especially when the processes compete for the same storage resource.

The data about the work of the processes of an application server is important, but is not critical for the provided services. In other words, if part of this data is lost for some reason, the work processes will still be able to function as requested by the consumers. Hence, potential data loss due to, for instance, unexpected shut downs, could be neglected. Additionally, this data is very rarely required in raw state. Once stored in a database or a file, the data is aggregated and processed to a predefined condensed structure before being used. For example, a service consumer provides identification information to a work process, such as type of caller application (e.g., 'Partner Application', 'Foreign Application', and 'Domestic Application'), an identification number, a username, etc. This information could be combined with service provider information, such as name of the service, the time when the service was called, etc., and stored in a database. However, a manager or an auditor may be interested only in the number of service calls per user in a given time interval. Therefore, it may not be necessary to store all data details directly in the permanent storage.

SUMMARY

Various embodiments of systems and methods for processing data in shared memory are described herein. A number of work processes of an application server write data in corresponding areas of shared memory. In one aspect, at least one data unit for a first process is read from a first area of the shared memory by the first process. The first process also reads at least one unit of data for a second process from a second area of the shared memory. In another aspect, the data units that are read are aggregated and saved in a storage by the first process. In yet another aspect, the first process writes information in a third area of the memory to indicate that the at least one unit of data for the first process and the at least one unit of data for the second process are read.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for processing data in shared memory are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
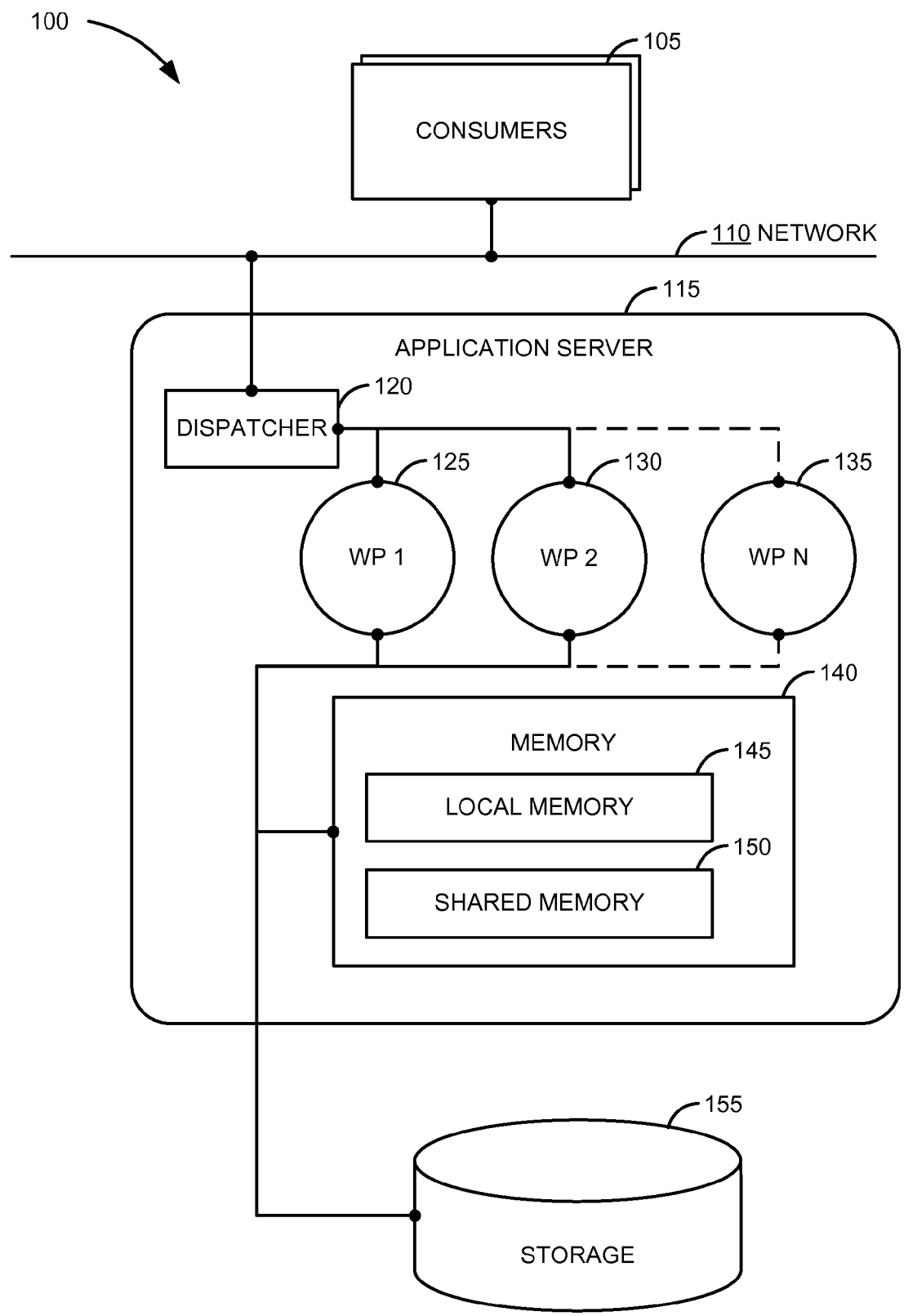
FIG. 1 is a block diagram of a computing environment for in-memory processing data, according to one embodiment of the invention.

In FIG. 1, an exemplary computer environment 100 including application server 115 providing services to a number of consumers 105 through network 110 is illustrated. Application server 115 runs a number of work processes to parallelize and distribute the workload, e.g., the processing of service requests coming from consumers 105. The incoming service requests are distributed by dispatcher 120 between work process (WP) "1" 125, WP "2" 130 and WP "N" 135, for execution. Each work process solely operates within its own memory area in local memory 145, during execution. Further, the work processes 125, 130 and 135 may access same areas of shared memory 150. Local memory 145 and shared memory 150 are part of memory 140 of application server 115. In one embodiment of the invention, memory 140 is volatile operative system memory such as random access memory (RAM). Alternatively, other types of dynamic memory could also be used.

Application server 115 may use the set of isolated work processes 125, 130 and 135 to deal with concurrent requests, parallelize the execution of services and tasks, and distribute the workload. Each work process generates or transmits data that is stored in permanent storage 155 in database tables or files. The data can be statistical data, e.g., the number of service calls the application server has executed. Storing such data can consume a large amount of system resources, especially if the execution time of a service task is very short. When application server 115 is loaded the data could occupy considerable space in the permanent storage. However, only an aggregated and condensed extraction of this data is actually needed. To decrease resource consumption, the data generated by the work processes 125, 130 and 135 is buffered in shared memory 150, and then the data is processed and transferred to storage 155 in aggregated state.

Each isolated work process is associated with a corresponding area of local memory 145 that cannot be accessed by the rest of the work processes 125, 130 and 135. In one embodiment of the invention, shared memory 150 can be accessed by all work processes 125, 130 and 135. Application server 115 divides shared memory 150 in areas, and enables parallel reading of the shared memory areas by work processes 125, 130 and 135. A work process can read and manage data from an area of the shared memory 150 by copying the data to a corresponding area in the local memory 145. Only one work process at a time can change a shared memory area. The writing in an area of the shared memory 150 needs additional locking steps to ensure that only one work process can write or change the content of the area. In another embodiment of the invention, parallel read and write operations can be supported by generating versions of the content of the shared memory 150.

Figure 2:
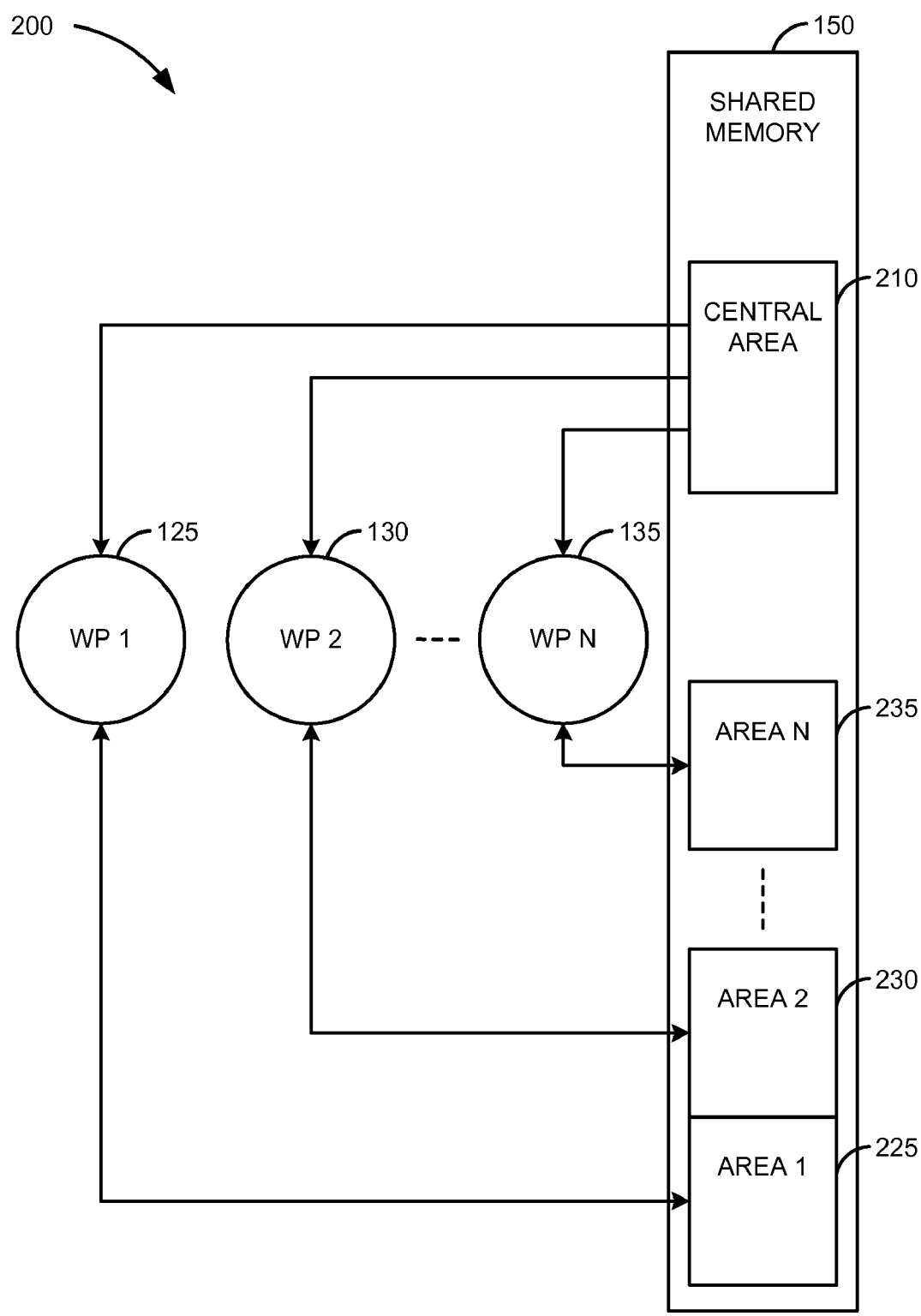
FIG. 2 is a block diagram of a number of work processes of an application server associated to a number of shared memory areas to write data units, according to one embodiment of the invention.

According to one embodiment of the invention, each of work processes WP "1" 125, WP "2" 130 and WP "N" 135 is assigned to one shared memory area, and is registered in a central shared memory area of shared memory 150, as illustrated in FIG. 2. In some embodiments of the invention, other shared memory areas could be also created and registered in parallel, if the memory infrastructure provides the necessary application programming interfaces (APIs). Block diagram 200 shows the organization of shared memory 150 in areas, and the correspondence between these areas and work processes WP "1" 125, WP "2" 130 and WP "N" 135. Work processes 125, 130 and 135 can read information from central area 210, as illustrated with arrows directed from central area 210 to WP "1" 125, WP "2" 130 and WP "N" 135. Work process "1" 125 has exclusive read and write access to area 225 of shared memory 150 as illustrated with bi-directional arrow connecting WP "1" 125 with area 225. Similarly, WP "2" 130 has exclusive read and write access to area 230, and WP "N" 135 has exclusive read and write access to area 235 of shared memory 150. Work process "1" 125 may still have read access to areas 230 and 235 of shared memory 150. Respectively, work process "2" 130 may have read access to areas 225 and 235, and work process "N" 135 may have read access to areas 225 and 230.

Figure 3:
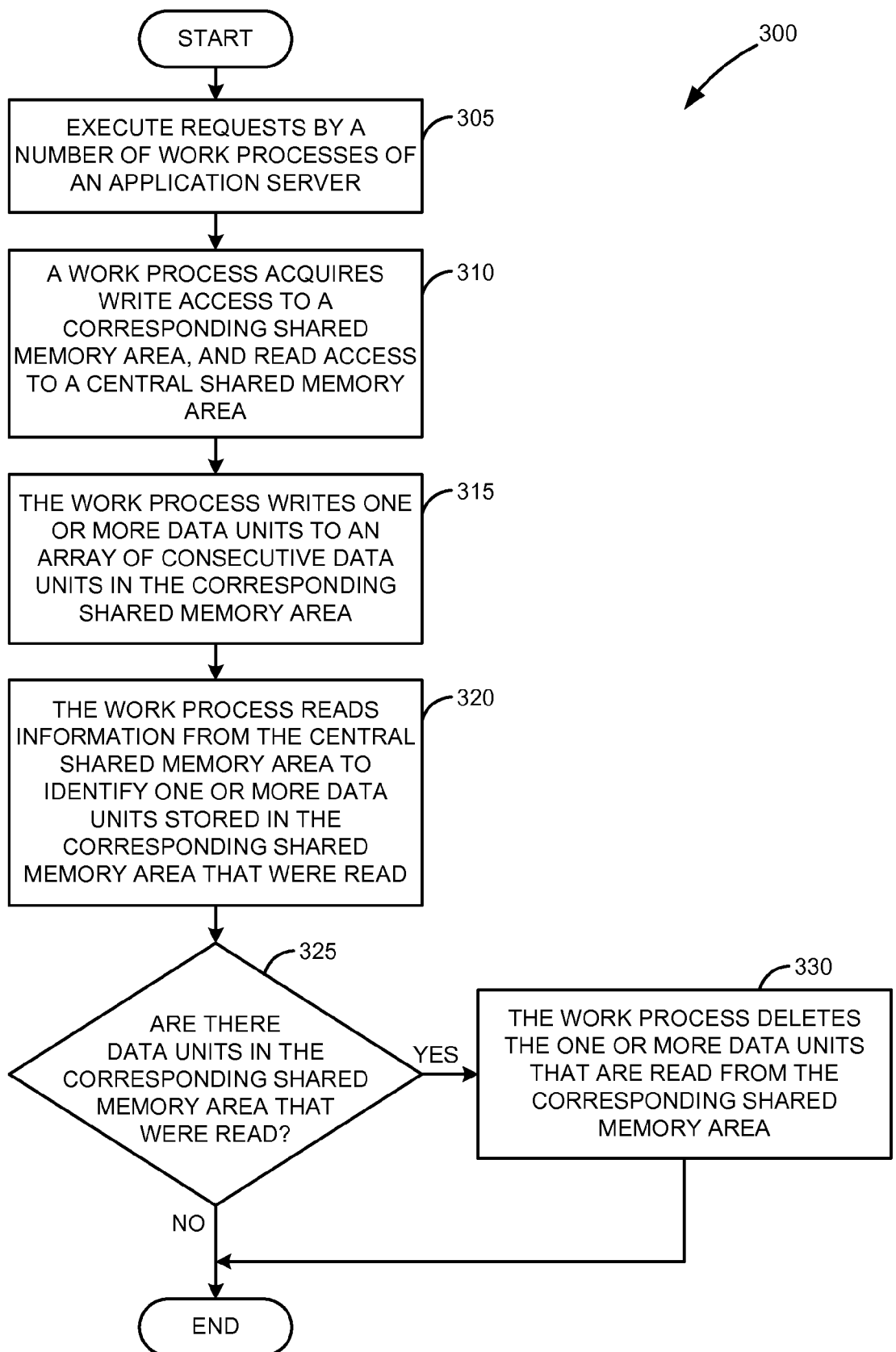
FIG. 3 is a flow diagram illustrating a procedure for writing data units in a shared memory area by a corresponding work process, according to one embodiment of the invention.

FIG. 3 shows procedure 300 for writing data for a work process in shared memory, according to one embodiment of the invention. A number of work processes of an application server execute service requests at 305. Every work process generates data related to their execution that could be needed later on for different purposes, such as management decisions, statistics, audits, etc. Procedure 300 continues at 310, where one of the running work processes acquires write access to a corresponding shared memory area and read access to a central memory area (e.g., 210). At 315, the work process writes one or more data units into its corresponding shared memory area. The data units may include information describing a request processed by the work process, consumer or user identification, processing time, type of requested service, information for the running application, etc.

In one embodiment of the invention, the data units are written in a shared memory area to form a sequence. The data units may consist of conventional data types, organized efficiently to administer large amounts of data. The written data units may form an array or a queue of consecutive data units, where the new data units are appended to the previously written data units. The data units may be read afterwards in the order they have been written, e.g., in first-in-first-out (FIFO) mode. The central shared memory area stores information indicating the processed data units in the other shared memory areas. For example, the central shared memory area may keep pointers assigned to each shared memory area corresponding to a work processes. Such a pointer may show the position of a last read (e.g., processed) data unit in an array of data units written in a shared memory area. This could be the position number of a data unit in the queue, or any other identifier that can specify data units across work process boundaries. The data in a shared memory area may be read by any of the running work processes, and used for further processing or storing.

At 320, the work process reads information from the central shared memory area to identify those data units stored in the corresponding shared memory area that were read. The data units in the shared memory can be read and processed by any of the work processes of the application server, according to one embodiment of the invention. At 325, a check is performed by the work process to verify whether there are data units in the corresponding shared memory area that were read, according to the information in the central shared memory area. If there are one or more data units that are previously read and, respectively, transferred to a storage, the work process deletes them from the corresponding shared memory area at 330. Thus, the volume of data units that are kept in the shared memory areas could be regulated.

Figure 4A:
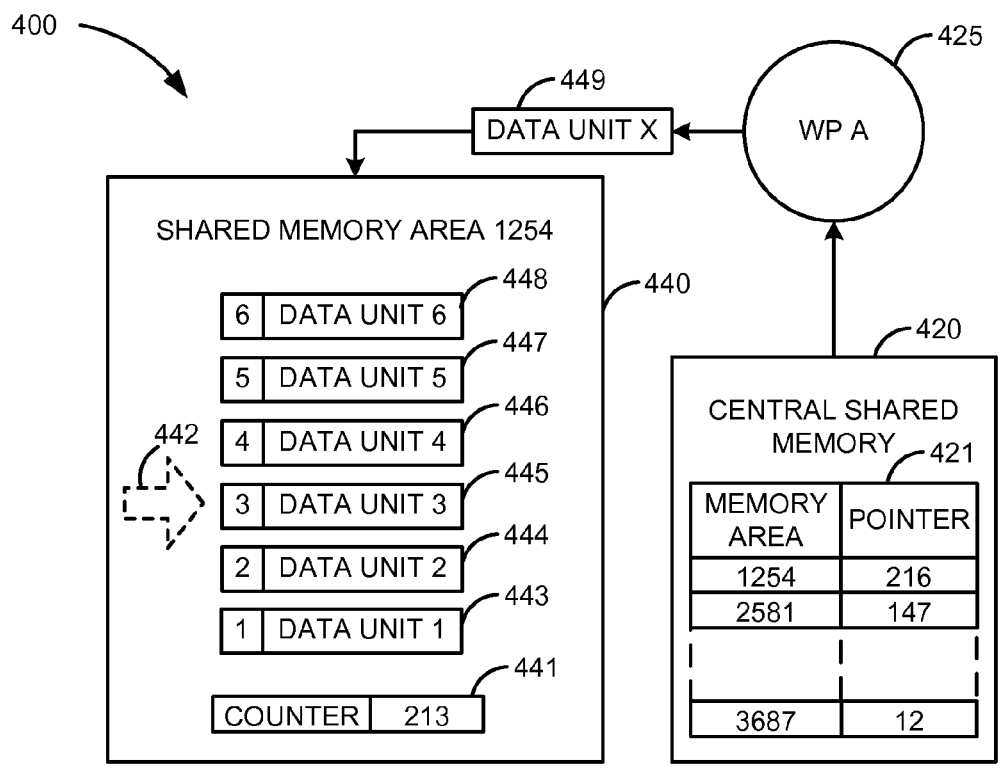
FIG. 4A is a block diagram of a state of shared memory areas before writing a data unit by a corresponding work process, according to one embodiment of the invention.

FIG. 4A is block diagram 400 that shows an exemplary state of a shared memory area "1254" 440 and a central shared memory 420, according to one embodiment of the invention. The state of the memory areas is a snapshot before the work process (WP) "A" 425 writes data unit "X" 449 in shared memory area 440. As illustrated, a number of data units 443 to 448 are already written in shared memory area "1254" 440. Data unit "1" 443 to data unit "6" 448 are arranged based on the order of writing. A label may be assigned to every written data unit indicating the position of the data unit within the sequence of data units currently written in the shared memory area "1254" 440. Counter 441 keeps track for the number of the data units previously deleted from the shared memory area "1254" 440.

Central shared memory 420 includes a list of references 421 to every shared memory area corresponding to a work process of the application server, including reference to shared memory area"1254" 440 corresponding to work process "A" 425. In one embodiment of the invention, each shared memory area corresponding to a work process is registered within list of references 421 when the shared memory area is created and assigned to the work process. The central shared memory 420 stores a pointer assigned to each reference in the list of references 421. The pointer may hold the number of read data units in the corresponding shared memory area. Thus, the difference between the pointer and the counter in the corresponding shared memory area indicates the number of read units that are present in the shared memory area. In one embodiment of the invention, the data units are read from shared memory area "1254" 440 in FIFO pattern.

As illustrated in FIG. 4A, the pointer associated to the reference to shared memory area "1254" 440 is set to number 216. Respectively, 216 data units were read from the shared memory area "1254" 440. The counter 441 is set to 213, e.g., as many as 213 data units are deleted from the shared memory area "1254" 440. The difference between the two numbers is 3, and this means that there are three data units in shared memory area "1254" 440 that are read, but not removed. Since the data units are read in the order of writing, it could be concluded that the first three data units, e.g., data unit "1" 442, data unit "2" 443 and data unit "3" 444, are processed by some work process. Arrow 442 points to the last read data unit, e.g., to data unit "3" 445 in the array of data units 443 to 448 currently written in shared memory area "1254" 440. The arrow 442 is drawn with dashed line to show that it is an optional element. The work process "A" 425, as well as any other work process with read access to the shared memory areas 440 and 420, may read the value of the pointer in the list of references 421, and compare it with the value of the counter 441 to identify read data units in shared memory area "1254" 440.

Figure 4B:
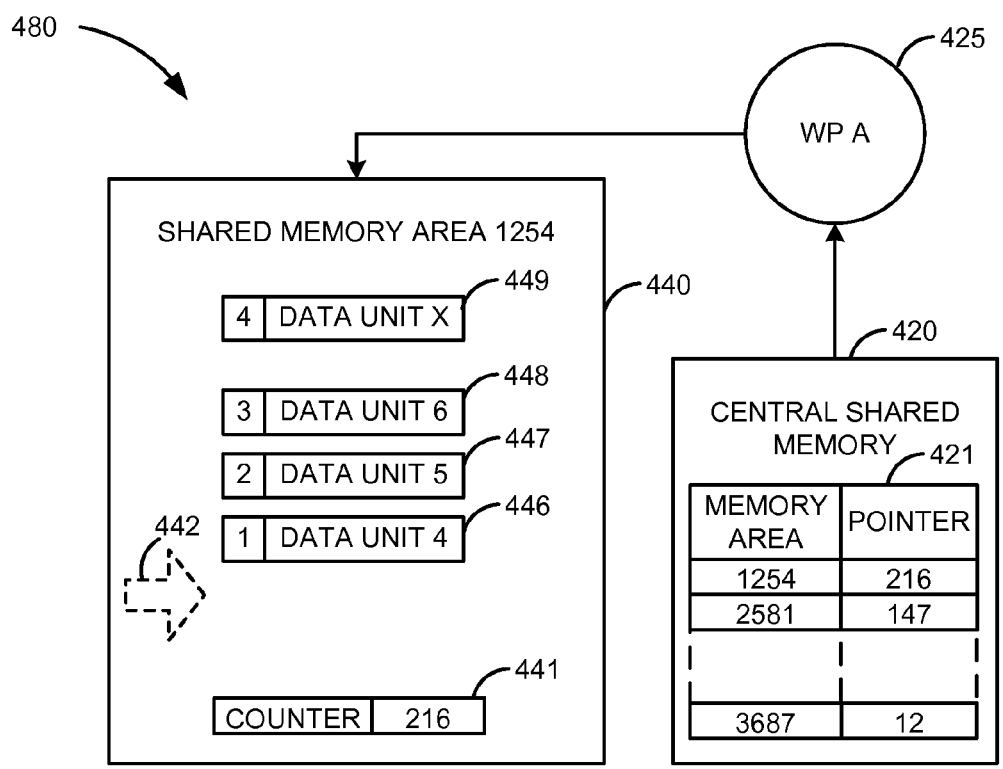
FIG. 4B is a block diagram of a state of the shared memory areas after writing the data unit by the corresponding work process, according to one embodiment of the invention.

The block diagram 480 of FIG. 4B shows the state of the shared memory area "1254" 440 after the work process "A" 425 has finished the operation for writing data unit "X" 449 as described in FIG. 3. The work process "A"425 has acquired write access to shared memory area "1254" 440 to accomplish the writing of data unit "X" 449. The work process 425 has also removed read data units 443, 444 and 445. The labels assigned to the data units 446 to 449 remaining in shared memory area "1254" 440 has been updated to reflect the new order of data units. Also, the work process 425 has increased the number of deleted data units in counter 441 to 216. The number of counter 441 equals the number of read data units held by the corresponding pointer in the list of references421 in central shared memory 420. Respectively, arrow 442 does not point to a data unit, as none of data units in shared memory area "1254" 440 is read, e.g., processed, by any work process.

According to one embodiment of the invention, the data units that are stored in shared memory are processed, e.g., read, aggregated, and persisted, to a database or a file in a storage. The processing of the data units could be invoked by a predefined condition, e.g., after a certain volume of data in the shared memory is reached; after a specified time period; relative to other system event; etc. The predefined condition may be based on risk evaluation as the data in the shared memory could be lost, for example, in case of an unexpected shutdown of the application server. The data units are read and processed from the shared memory areas by one of the work processes. Thus, the proposed solution reduces the number of the expensive data saving operations, and eliminates the competition for storage resources between the parallel work processes at tolerable risk level. Every one of the running work processes could read the collected data units in the shared memory areas, depending on a condition, current work load, rotation principle, etc.

Figure 5:
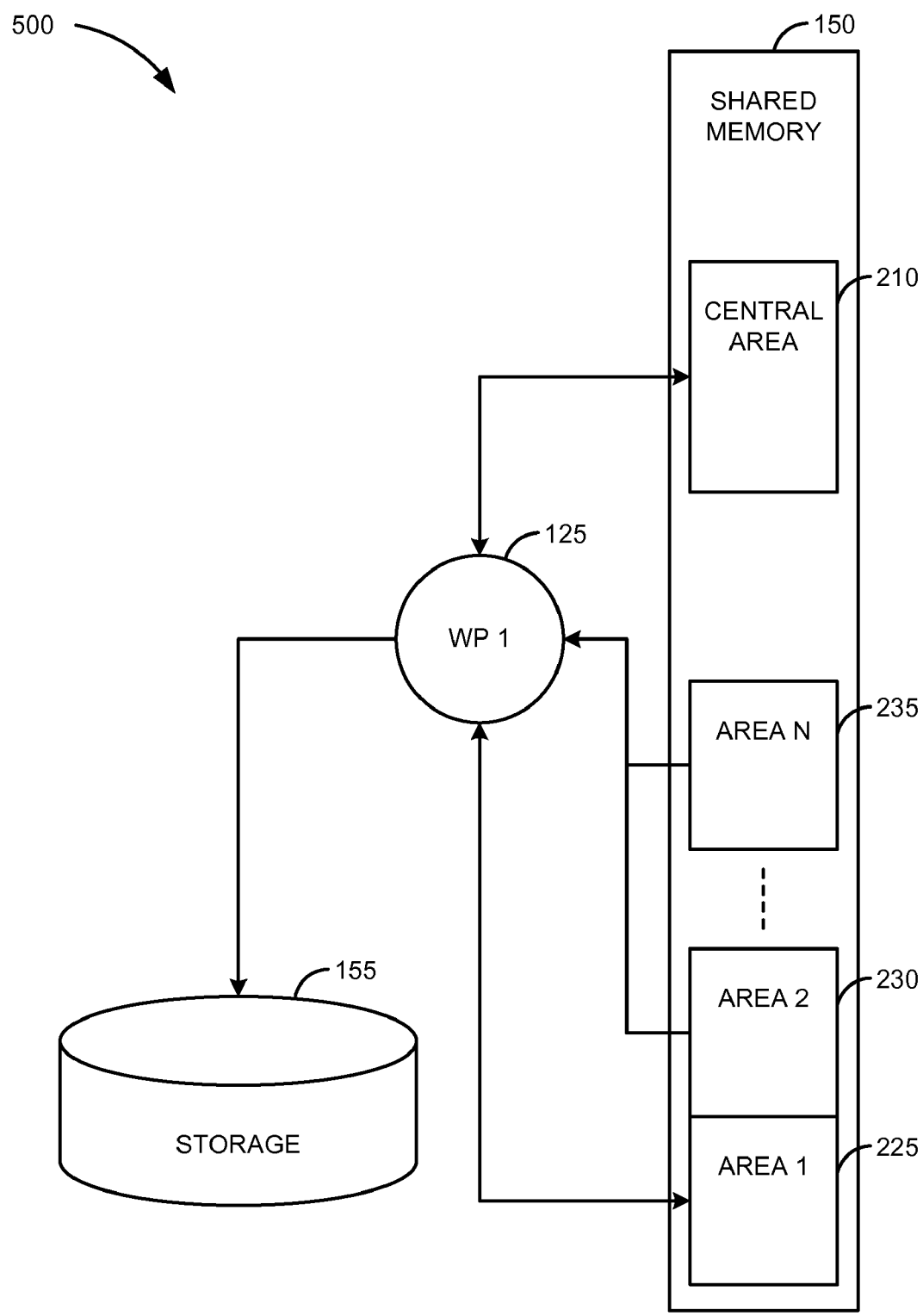
FIG. 5 is a block diagram of a work process of an application server associated to a number of shared memory areas to read data units, according to one embodiment of the invention.

FIG. 5 shows block diagram 500 where work process "1" 125 reads data from areas 225 to 235 of shared memory 150, and saves the data in storage 155. Work process "1" 125 may acquire write access to central area 210 to identify the previously read data units, and to update the information indicating the number of read data units per shared memory area. Work process "1" 125 could also delete the data units from area 225 of shared memory 150 and initialize or reset the respective information in central area 210.

Figure 6A:
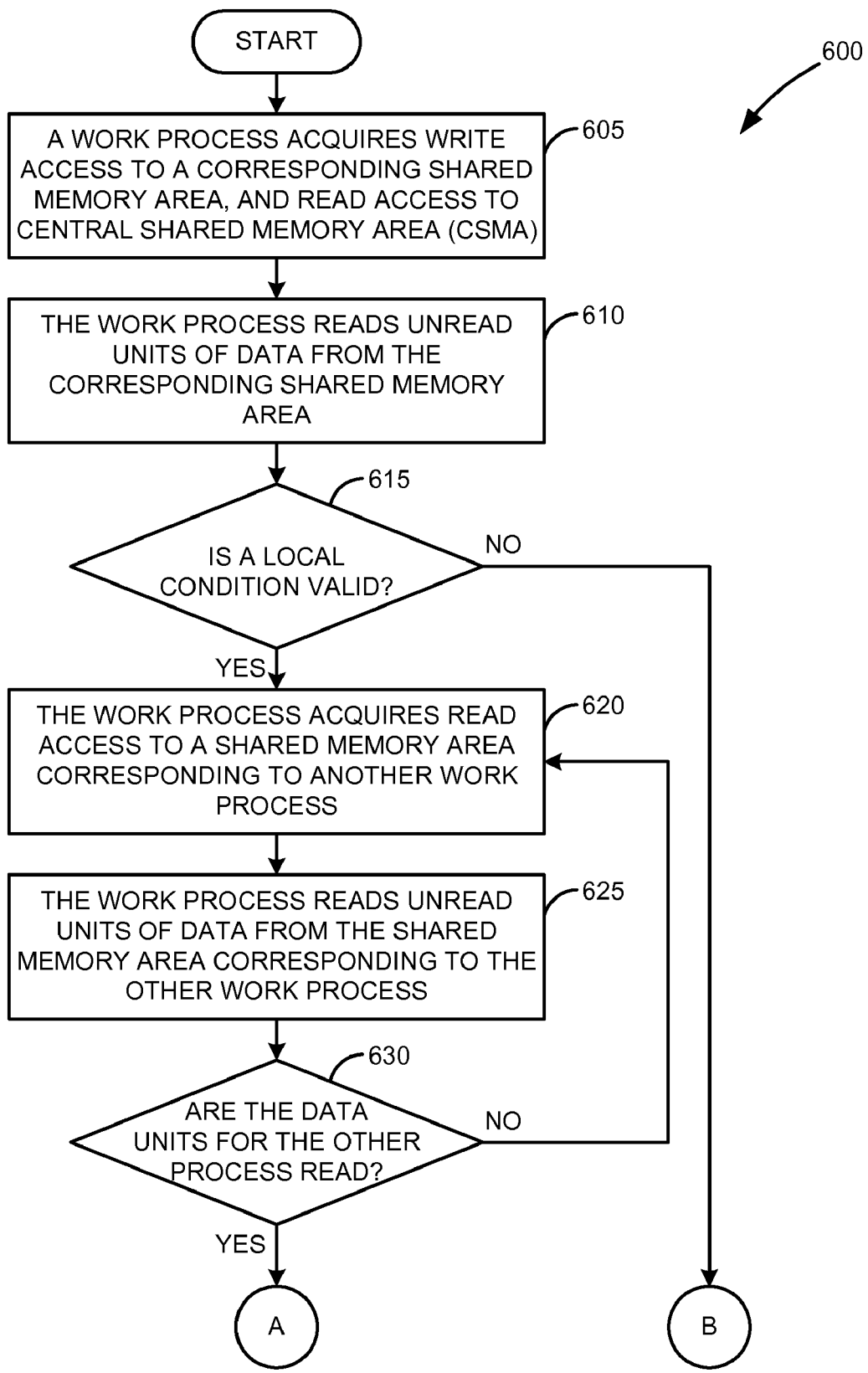
FIG. 6A is a flow diagram illustrating a first part of a procedure for reading data units from shared memory areas by a work process, according to one embodiment of the invention.

FIG. 6A illustrates first part 600 of a procedure for reading data units from a number of shared memory areas assigned to a number of running work processes, according to one embodiment of the invention. At 605, a work process from the number of work processes acquires a write access to a corresponding shared memory area, and read access to a central shared memory area. The information in the central shared memory area helps the work process to identify the data units in the corresponding shared memory area that are already read. At 610, the work process reads the unread (e.g., not processed) units of data from the shared memory area.

In one embodiment of the invention, a local condition is set for a shared memory area for transferring the data corresponding to a work process to a permanent storage. The local condition could be related to events such as reaching a predefined volume of written data units; a time period; etc. For example, if the total shared memory size is limited, the local condition for a particular shared memory area could be when the size of the shared memory area reaches the total size limit of the shared memory divided by the number of running work processes. Other types of local conditions could be defined, depending on a specific embodiment and the acceptable level of risk.

At 615, a check is performed to verify whether the local condition set for the shared memory area corresponding to the reading work process is valid. If the validity of the local condition is confirmed, e.g., the condition is validated, the work process acquires read access to a shared memory area corresponding to another one of the running work processes at 620. Based on the indication in the central shared memory area, the work process reads the unread units of data from the shared memory area corresponding to the other work process at 624. The work process repeats tasks 620 and 625 for every shared memory area corresponding to work processes, until, at 630, it is confirmed that the data units for the remaining work processes are read. According to one embodiment of the invention, the reading work process may not be able to read data units from one or more of the shared memory areas unless their corresponding work processes have written new data units into shared memory areas. Therefore, the tasks 620 and 625 are repeated until it is confirmed that all data units available for reading are read by the reading work process.

Figure 6B:
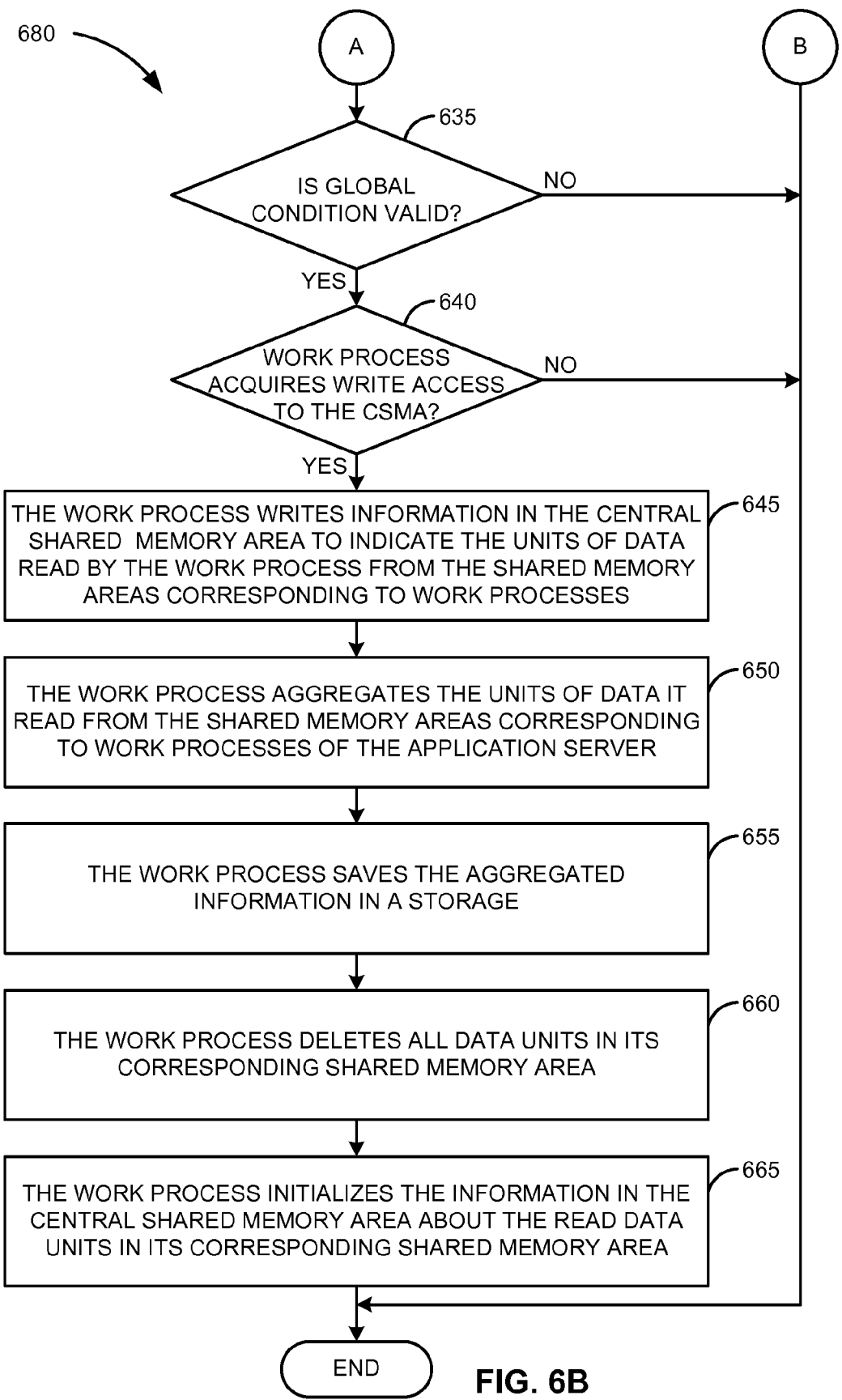
FIG. 6B is a flow diagram illustrating a second part of the procedure for reading data units from the shared memory areas by the work process, according to one embodiment of the invention.

The flowchart illustrated in FIG. 6B shows the second part 680 of the procedure for reading units of data from the shared memory areas assigned to the running work processes. The process continues at 635 where the reading work process performs a check to verify the validity of a global condition. In one embodiment of the invention, the check may be based on the currently read data units. If the global condition is valid, the work process attempts to acquire write access to the central shared memory area at 640. The procedure ends, if acquiring such access fails because of some reason, e.g., if another work process currently has write access to the central shared memory. If the work process has successfully acquired write access to the shared memory area, the procedure continues at 645. The work process writes information into the central shared memory area indicating the units of data read from the shared memory areas corresponding to the work processes running in the application server. The work process may simply update the information in the central shared memory area with the number of the newly read units of data per registered shared memory area.

At 650, the reading work process aggregates the units of data it has read from the shared memory areas corresponding to the work processes of the application server. The aggregation of data units could be based on a predefined algorithm. During the aggregation, the work process may use a local memory area for calculation and temporary saving of the read units of data. The aggregated information includes data for the working processes of the application server which is necessary for monitoring, management, auditing, and other purposes. At 655, the reading work process saves the aggregated information in a storage.

The buffering of data in the shared memory areas instead of saving it directly in the storage may significantly decrease the number of the save operations. Additionally, the aggregation of the data saves resources, mostly in terms of storage space. At 660 the work process deletes the data units in the corresponding shared memory area, as the data units are processed, e.g., information is extracted and persisted in the storage. At 665, the work process initializes the information in the central shared memory area about the shared memory area corresponding to the reading work process. In one embodiment of the invention, the initialization may mean resetting the value stored in the central memory area showing the number of processed data units from the shared memory area corresponding to the work process.

Figure 7A:
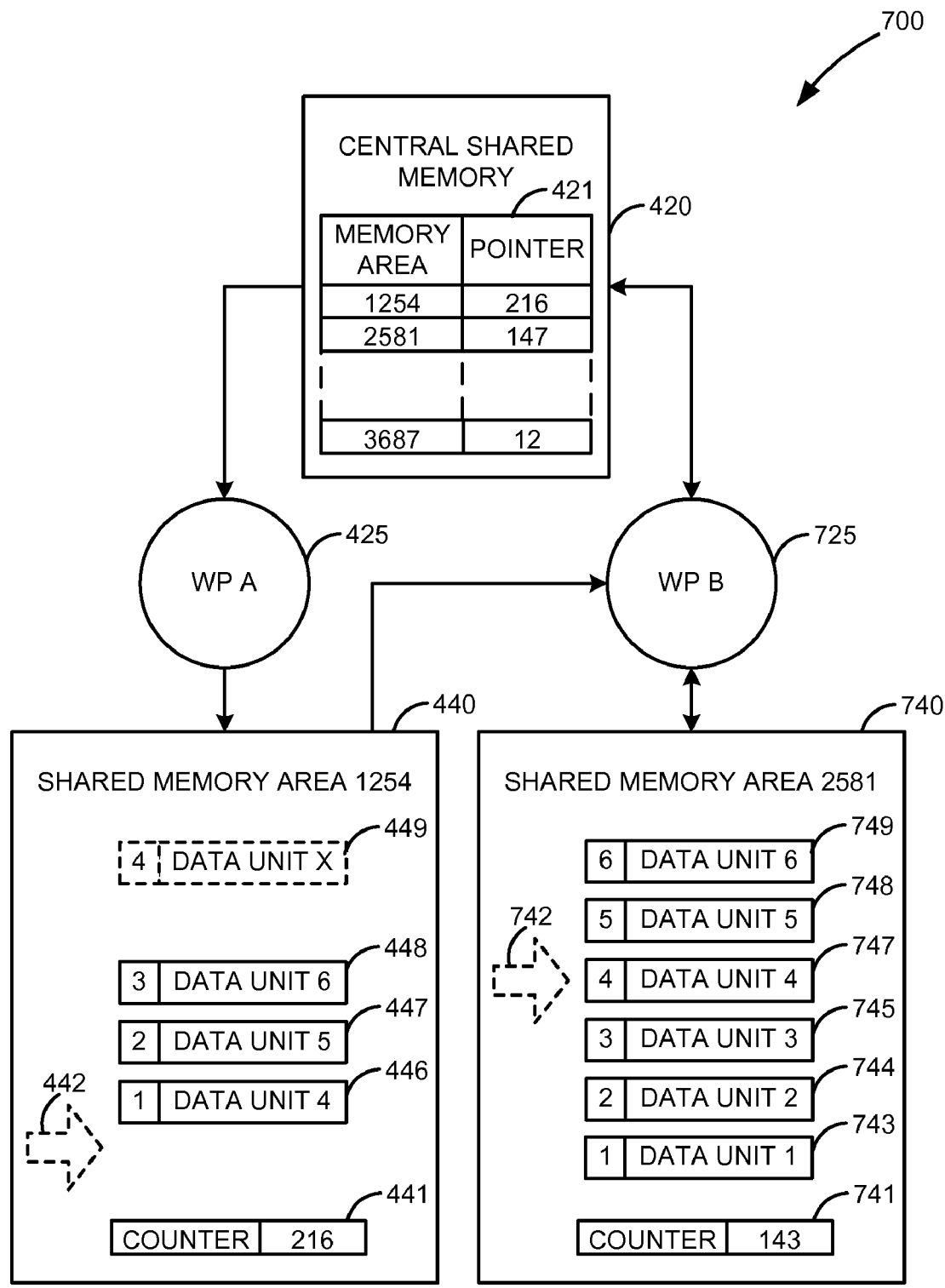
FIG. 7A is a block diagram of a state of shared memory areas before reading data units by a work process, according to one embodiment of the invention.

FIG. 7A is block diagram 700 that shows an exemplary state of shared memory areas "1254" 440 and "2581" 740, and a central shared memory 420, according to one embodiment of the invention. The state of the memory areas 440, 740 and 420 is a snapshot before the work process (WP) "B" 725 reads data units from shared memory areas "1254" 440 and "2581" 740 as described in FIG. 6A and FIG. 6B. Work process "A" 425 is currently writing data unit "X" 449 in shared memory area "1254" 440. The data unit "X" 449 is drawn with dashed line to illustrate that is still not available for reading by other processes, except work process "A" 425. Data units 446, 447 and 448 in shared memory area "1254" are available for reading by any of the running work processes of the application server, including work process "B" 725. Counter 441 and the corresponding pointer in the list of references 421 in central memory area 420 hold the same values, e.g., the number of deleted data units from shared memory area "1254" 440 equals the number of read values. Respectively, none of the array of data units in the shared memory area "1254" is read, and the arrow 442 does not point to a data unit.

Shared memory area "2581" 740 contains an array of data units 743 to 748. Counter 741 informs that 143 data units have been deleted from the shared memory area "2581" 740. The corresponding pointer in the list of references 421 is set to 147 processed data units from the shared memory area "2581" 740. Therefore, the first four of the data units in shared memory area "2581" are read, which is illustrated with arrow 742 pointed at data unit "4" 747. Arrows 442 and 742 are drawn with dashed lines to illustrate that they may not be included in shared memory areas "1254" 440 and "2581" 740, according to one embodiment of the invention.

Work process "B" 725 has write access to shared memory area "2581" 740 and to central shared memory 420. In addition to this, work process "B" 725 has read access to shared memory area "1254" 440. The acquired access rights are sufficient for work process "B" 725 to process the available data units in shared memory areas "1254" 440 and "2581" 740.

Figure 7B:
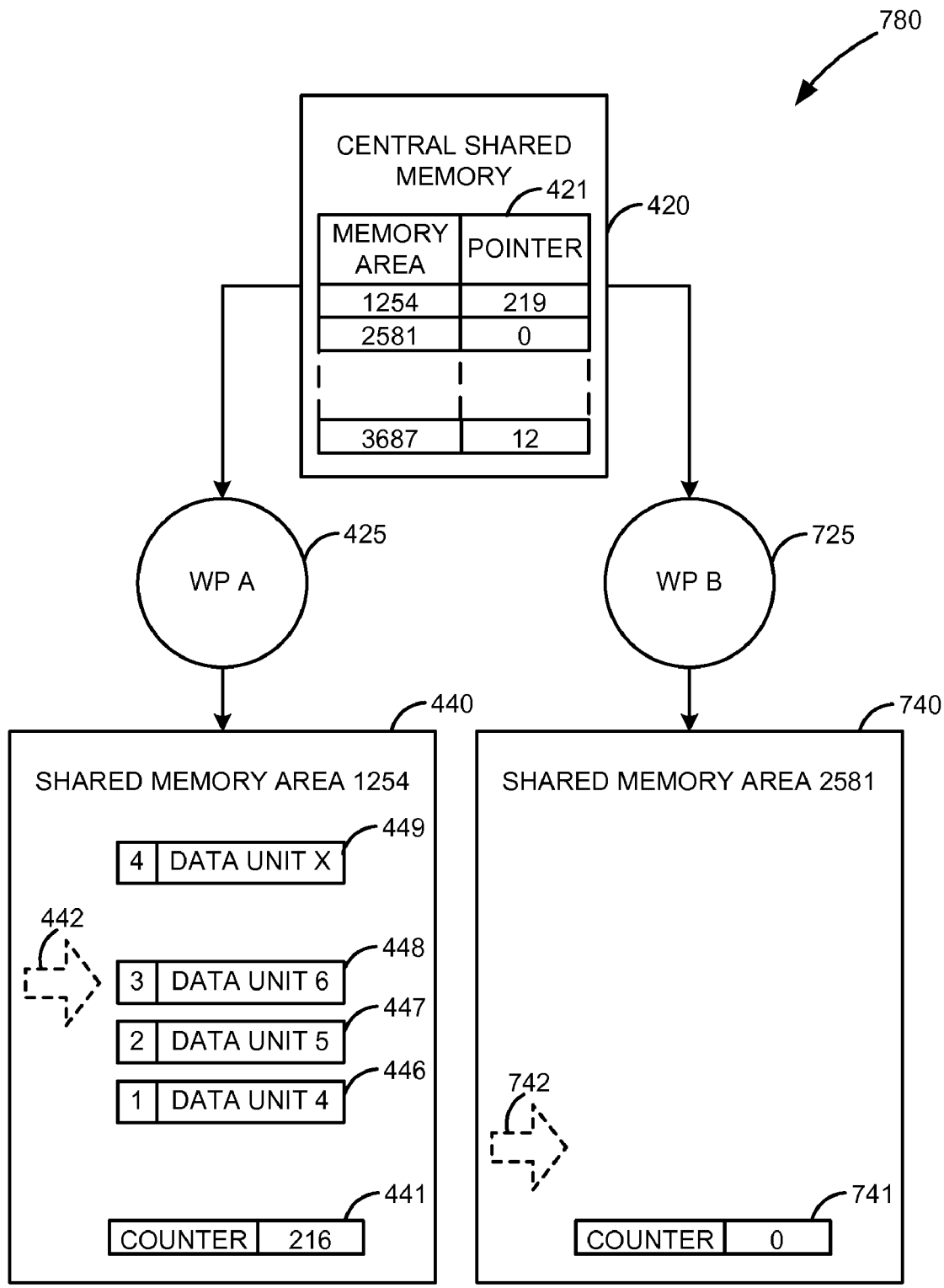
FIG. 7B is a block diagram of a state of the shared memory areas after reading the data units by the work process, according to one embodiment of the invention.

The block diagram 780 of FIG. 7B shows the state of shared memory areas "1254" 440 and "2581" 740, and central shared memory 420 after the work process "B" 725 has finished the processing of the available data units. Work process "A" 425 has also finished the writing operation for data unit "X" 449 in shared memory area "1254" 440. Therefore data unit "X" 449 is drawn with solid lines. Counter 441 was not changed, as work process "A" 425 has started the writing of data unit "X" 449 before the reading operation performed by work process "B" 725, and hence, no read unit was identified by the work process "A" 425 in shared memory area "1254" 440 for deletion. Work process "B" 725 has read the available data units 446 to 448, and has accordingly increased the number of read data units of the pointer corresponding to the shared memory area "1254" 440 in the list of references 421 in central shared memory 420. The arrow 442 points to the last read data unit 6 448 to illustrate that data units 446 to 448 in shared memory area "1254" 440 are processed.

Work process "B" 725 had read all data units in shared memory area "2581" 740. Using the exclusive write and read access, the work process "B" 725 has deleted the processed data units from shared memory area "2581" 740. In one embodiment of the invention, work process "B" 725 has reset the counter 741 and the pointer corresponding to shared memory area "2581" 740 in the list of references 421. The initialization of counter 741 and the corresponding pointer in the list of references 421 may help to avoid a potential integer overflow error. Arrow 742 does not point to any data unit, as shared memory area "2581" 740 is empty.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like.

They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
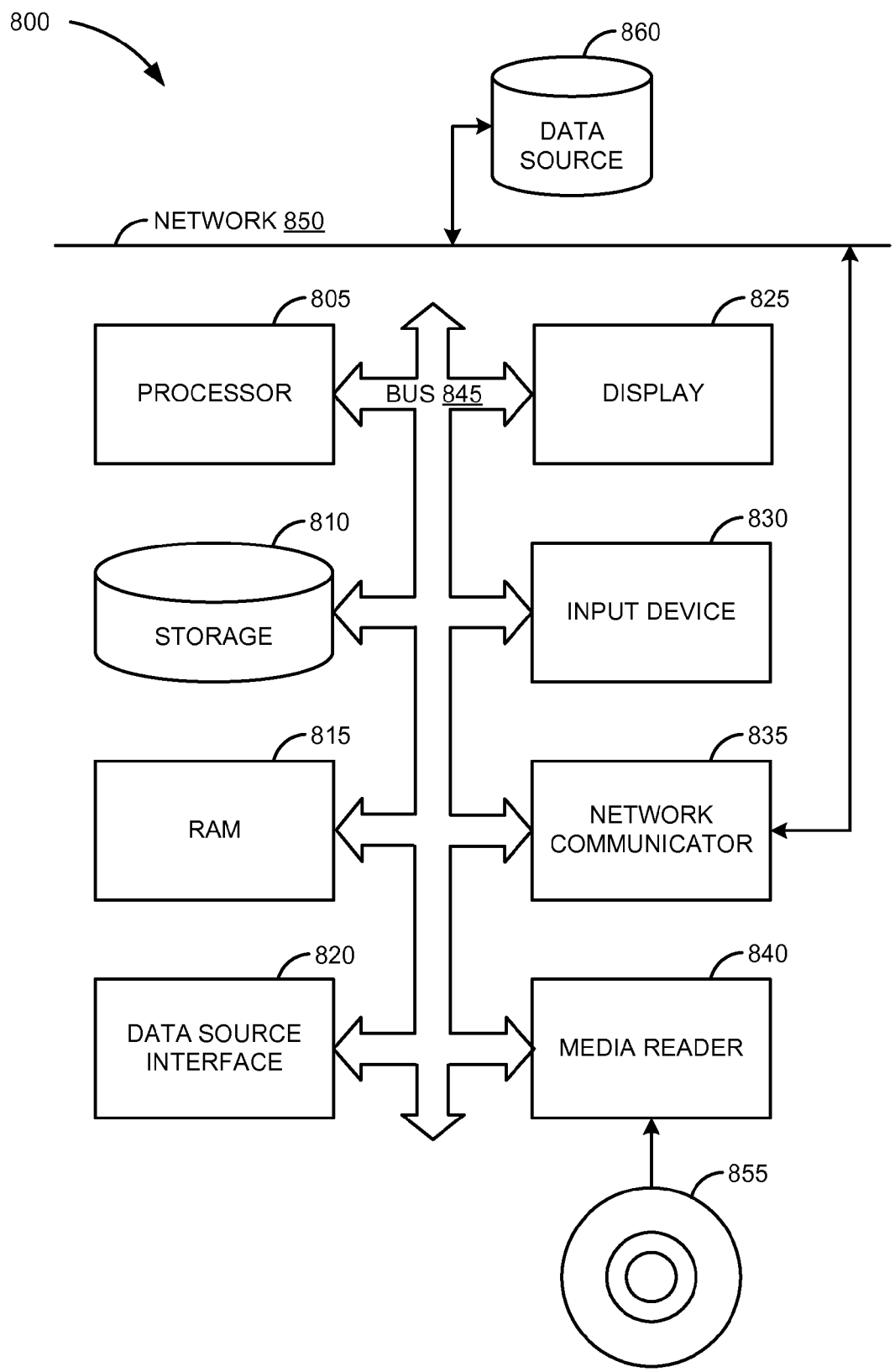
FIG. 8 is a block diagram of an exemplary computer system to process data in shared memory, according to one embodiment of the invention.

FIG. 8 is a block diagram of an exemplary computer system 800. The computer system 800 includes a processor 805 that executes software instructions or code stored on a computer readable storage medium 855 to perform the above-illustrated methods of the invention. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to store instructions, which when executed by a computer, cause the computer to:

write a plurality of data units associated with a plurality of work processes of an application server into a plurality of memory areas of a shared memory, wherein each work process of the plurality of work processes corresponds to at least one of the memory areas of the plurality of memory areas;

read at least one data unit from a first memory area of the plurality of memory areas by a first work process of the plurality of work processes;

read at least one data unit from a second memory area of the plurality of memory areas by the first work process;

write information in a third memory area of the plurality of memory areas to indicate that the at least one data unit from the second memory area is read;

save the at least one data unit from the first memory area and the at least one data unit from the second memory area to a storage;

delete the at least one data unit from the first memory area by the first work process; and initialize information that corresponds to the first memory area in the third memory area by the first work process.

2. The article of manufacture of claim 1, wherein the non-transitory computer readable storage medium stores further instructions, which when executed by a computer cause the computer to:

read information that corresponds to the second memory area from the third memory area by a second work process of the plurality of work processes; and delete the at least one data unit in the second memory area by the second work process based on the read information.

3. The article of manufacture of claim 1, wherein reading the at least one data unit from the second memory area comprises:

reading the at least one data unit from the second memory area upon verifying that a predefined local condition is valid.

4. The article of manufacture of claim 1, wherein writing the information in the third memory area comprises:

acquiring exclusive write access to the third memory area by the first work process to ensure consistent change of the information.

5. The article of manufacture of claim 1, wherein saving the at least one data unit from the first memory area and the at least one data unit from the second memory area comprises:

sending the at least one data unit from the first memory area and the at least one data unit from the second memory area to the storage upon verifying that a predefined global condition is valid.

6. The article of manufacture of claim 1, wherein saving the at least one data unit from the first memory area and the at least one data unit from the second memory area comprises:

aggregating the at least one data unit from the first memory area and the at least one data unit from the second memory area according to a predefined algorithm.

7. The article of manufacture of claim 1, wherein initializing the information that corresponds to the first memory area in the third memory area comprises:

resetting a counter in the first memory area by the first process, wherein the counter holds a total of data units deleted from the first memory area.

8. A computerized method for data processing in shared system memory, the method comprising:

reading at least one data unit for a first process of a plurality of processes from a first memory area by the first process;

reading at least one data unit for a second process of the plurality of processes from a second memory area by the first process;

writing information in a third memory area to indicate that the at least one data unit for the second process is read, wherein the information in the third memory area is written by the first process;

the first process, saving the at least one data unit for the first process and the at least one data unit for the second process in a storage;

deleting the at least one data unit for the first process in the first memory area by the first process; and initializing information that corresponds to the first memory area in the third memory area by the first work process.

9. The method of claim 8 further comprising:

reading information that corresponds to the second memory area from the third memory area by the second process; and deleting the at least one data unit for the second process in the second memory area by the second process based on the read information.

10. The method of claim 8, wherein reading the at least one data unit for the second process comprises:

verifying a validity of a predefined local condition; and reading the at least one data unit for the second process of the plurality of processes from the second memory area by the first process when the local condition is valid.

11. The method of claim 8, wherein writing the information in the third memory area comprises:

acquiring exclusive write access to the third memory area by the first process to ensure consistent change of the information.

12. The method of claim 8, wherein saving the at least one data unit for the first process and the at least one data unit for the second process comprises:

verifying a validity of a predefined global condition; and sending the at least one data unit for the first process and the at least one data unit for the second process in the storage by the first process when the global condition is valid.

13. The method of claim 8, wherein saving the at least one data unit for the first process and the at least one data unit for the second process comprises:

aggregating the at least one data unit for the first process and the at least one data unit for the second process by the first process according to a predefined rule; and saving the aggregated data in the storage by the first process.

14. The method of claim 8, wherein initializing the information that corresponds to the first memory area in the third memory area comprises:

resetting a counter in the first memory area by the first process, wherein the counter holds a total of data units deleted from the first memory area.

15. The method of claim 9 further comprising:

updating a counter in the second memory area by the second process, wherein the counter holds a total of data units deleted from the second memory area.

16. A computer system for data processing in shared memory comprising:

a computer memory to store program code; and a processor to execute the program code to:

read at least one data unit from a first memory area of a plurality of memory areas by a first process of a plurality of processes, read at least one data unit from a second memory area of the plurality of memory areas by the first process, write information in a third memory area of the plurality of memory areas to indicate that the at least one data unit from the second memory area is read, send the at least one data unit from the first memory area and the at least one data unit from the second memory area to a storage, delete the at least one data unit from the first memory area by the first process, and initialize information that corresponds to the first memory area in the third memory area by the first work process.

17. The system of claim 16, wherein the memory stores further program code, which when executed causes the processor to:

read information that corresponds to the second memory area from the third memory area by a second work process of the plurality of work processes; and delete the at least one data unit in the second memory area by the second process, based on the read information.

18. The system of claim 16, wherein reading the at least one data unit from the second memory area comprises:

verifying a validity of a predefined local condition; and reading the at least one data unit from the second memory area by the first process when the local condition is valid.

19. The system of claim 16, wherein sending the at least one data unit from the first memory area and the at least one data unit from the second memory area comprises:

verifying a validity of a predefined global condition; and sending the at least one data unit from the first memory area and the at least one data unit from the second memory area to the storage when the global condition is valid.

20. The system of claim 16, wherein sending the at least one data unit from the first memory area and the at least one data unit from the second memory area comprises:

aggregating the at least one data unit from the first memory area and the at least one data unit from the second memory area according to a predefined rule.

* * * * *